United States Patent
Anderson et al.

(10) Patent No.: US 11,889,508 B1
(45) Date of Patent: Jan. 30, 2024

(54) SYSTEM AND METHOD FOR MANAGING A CELLULAR NETWORK

(71) Applicant: Keysight Technologies, Inc., Santa Rosa, CA (US)

(72) Inventors: Alan John Anderson, Scotland (GB); Francisco Javier Garcia Garcia, Fife (GB); Jan Erik Schiefer, Seattle, WA (US); Michael Dieudonné, Leuven (BE)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 307 days.

(21) Appl. No.: 17/484,503

(22) Filed: Sep. 24, 2021

(51) Int. Cl.
 *H04W 72/21* (2023.01)
 *H04W 72/1268* (2023.01)

(52) U.S. Cl.
 CPC ....... *H04W 72/21* (2023.01); *H04W 72/1268* (2013.01)

(58) Field of Classification Search
 CPC .................. H04W 72/21; H04W 72/1268
 See application file for complete search history.

(56) References Cited

U.S. PATENT DOCUMENTS

| | | | | |
|---|---|---|---|---|
| RE48,134 E | * | 7/2020 | Gravely | H04L 43/18 |
| 2022/0021423 A1 | * | 1/2022 | Ahmed | H04B 7/0617 |
| 2022/0201796 A1 | * | 6/2022 | Nakata | H04W 88/085 |
| 2022/0232423 A1 | * | 7/2022 | Thyagaturu | H04W 28/08 |
| 2023/0046743 A1 | * | 2/2023 | Vaez-Ghaemi | H04B 10/25759 |
| 2023/0209549 A1 | * | 6/2023 | Amuru | H04W 28/02 370/329 |

FOREIGN PATENT DOCUMENTS

WO 2020217989 A1 10/2020

OTHER PUBLICATIONS

O-RAN.WG4.CTI-TMP.0-v01.00 O-RAN WG4 "Transport Management Plane Specification" (Year: 2021).*
"Test Suite for O-RAN Specifications", VIAVI Solutions Inc., 2021, viavisolutions.com, pp. 1-14.
English translation of WO2020217989A1, pp. 1-27.

* cited by examiner

*Primary Examiner* — Basil Ma (57) ABSTRACT

A system for managing a cellular network implemented based on O-RAN standards includes an O-DU for generating a first control-plane message requesting a first set of radio resources responsive to a scheduled uplink transmission from a user device, where the first set of radio resources includes an assigned portion of a carrier signal allocated for the uplink transmission; an interposer unit for receiving the first control-plane message, and generating a second control-plane message requesting a second set of radio resources including a remaining portion of the carrier signal; and an O-RU for receiving the first and second control-plane messages, receiving the uplink transmission, and generating user-plane message(s) including first and second digitized data correlated with the first and second control-plane messages. The interposer unit sends the first digitized data to the O-DU without sending the second digitized data, and monitors the carrier signal using the first and second digitized data.

20 Claims, 3 Drawing Sheets

SYSTEM AND METHOD FOR MANAGING A CELLULAR NETWORK

BACKGROUND

Cellular communication networks generally include base stations that provide corresponding cells for exchanging information with wireless user devices or user equipment (UE), such as cellular telephones. Operation of a cellular communication network is coordinated through a control network, which includes cellular fronthaul at the base stations for allocating radio resources among the wireless devices. In the fronthaul environment, digitized versions of downlink and uplink signals between the base station and the user devices are sent between the different network devices of the control network to enable the coordination.

Fronthaul links are monitored for interference management of the uplink signals in the fronthaul environment. In the past, the Common Public Radio Interface (CPRI) standard was used to provide interfaces between Radio Equipment (RE) of the cellular communication network and the control network. In accordance with the CPRI standard, complete bandwidths of the uplink signals were monitored for interference sources. However, recently adopted Open Radio Access Network (O-RAN) standards implement data saving techniques that result in interference management being limited to portions of a carrier signal specifically allocated to the user devices for uplink communications signal. That is, according to O-RAN standards, only portions of the carrier signal (uplink spectrum) that are expected to contain user data are transmitted to the control network. This means that traffic on the fronthaul links is correlated with user data used by the user devices, so when there is no data scheduled to be transmitted over the air (OTA) by user devices, there will be no traffic. Therefore, there will be no monitoring of interference sources when there is no data being transmitted, or the monitoring will be limited to frequencies assigned to the uplink spectrum. While efficiently reducing the amount of data to be processed by the network operator, the O-RAN standards technique makes observing the uplink radio environment for interference management more difficult.

Accordingly, a network management system and technique are needed that improve interference management of the uplink radio environment, while maintaining data saving advantages otherwise provided of O-RAN standards.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like devices.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one having ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Generally, the various embodiments herein improve interference detection and management of a cellular network by viewing the full spectrum of the carrier signal used for uplink transmissions from user devices, thereby overcoming limitations otherwise imposed by O-RAN standards. More particularly, the various embodiments enable observation of interferers that are active at times and frequencies other than those used by legitimate user devices during uplink transmissions. By viewing the full spectrum of the carrier signal, detection and characterization of interference sources is easier, which enables informed scheduling decisions to work around the interference sources. In contrast, conventional interference management systems using O-RAN standards do not observe the unused spectrum, and therefore do not observe interferers directly, as the only data they will observe will have a legitimate uplink transmission added to it. For example, network operators of conventional interference management systems must deploy additional hardware, or send mobile measurement devices into the field (drive test), in order to observe the unused spectrum. The various embodiments herein enable observation of interference signals that are not interacting with a data transmission, leading to more thorough recognition and understanding of rogue signal characteristics.

According to a representative embodiment, a system is provided for managing a cellular network implemented based on Open Radio Access Network (O-RAN) standards. The system includes an O-RAN distributed unit (O-DU) configured to generate a first control-plane message requesting a first set of radio resources responsive to a scheduled uplink transmission from a user device, where the first set of radio resources includes an assigned portion of a carrier signal allocated for the uplink transmission; an interposer unit configured to receive the first control-plane message from the O-DU, and to generate a second control-plane message requesting a second set of radio resources, where the second set of radio resources includes a remaining portion of the carrier signal not allocated for the uplink transmission; and an O-RAN radio unit (O-RU) configured to receive the first control-plane message and the second control-plane message from the interposer unit, to receive the uplink transmission from the user device, and to generate at least one user-plane message including first digitized data from the uplink transmission correlated with the first control-plane message and second digitized data from the uplink transmission correlated with the second control-plane message. The interposer unit is further configured to receive the at least one user-plane message from the O-RU, to send the first digitized data to the O-DU without sending the second digitized data to the O-DU, and to monitor the carrier signal using both the first digitized data and the second digitized data.

According to another representative embodiment, a method is provided for managing a cellular network implemented consistent with O-RAN standards. The method includes receiving from a first network device a first control-plane message requesting a first set of radio resources responsive to a scheduled uplink transmission from a user device, where the first set of radio resources includes an assigned portion of a carrier signal allocated for the uplink transmission; generating a second control-plane message requesting a second set of radio resources, where the second set of radio resources includes a remaining portion of the carrier signal not allocated for the uplink transmission; sending the first control-plane message and the second control-plane message to a second network device configured to receive the uplink transmission from the user device; receiving from the second network device at least one user-plane message including first digitized data from the uplink transmission correlated with the first control-plane message and second digitized data from the uplink transmission correlated with the second control-plane message; sending the first digitized data to the first network device, and not sending the second digitized data to the first network device; and monitoring the carrier signal for interference sources using both the first digitized data and the second digitized data.

According to another representative embodiment, a non-transitory computer readable medium is provided for storing instructions for managing a cellular network implemented consistent with O-RAN standards. When executed by a processing unit, the instructions cause the processing unit to control a process including receiving from an O-DU a first control-plane message requesting a first set of radio resources responsive to a scheduled uplink transmission from a user device, where the first set of radio resources includes an assigned portion of a carrier signal allocated for the uplink transmission; generating a second control-plane message requesting a second set of radio resources, where the second set of radio resources include a remaining portion of the carrier signal not allocated for the uplink transmission; sending the first control-plane message and the second control-plane message to an O-RU configured to receive the uplink transmission from the user device; receiving from the O-RU at least one user-plane message including first digitized data from the uplink transmission correlated with the first control-plane message and second digitized data from the uplink transmission correlated with the second control-plane message; sending the first digitized data to the first network device, and not send the second digitized data to the O-DU; and monitoring the carrier signal for interference sources using both the first digitized data and the second digitized data.

Figure 1:
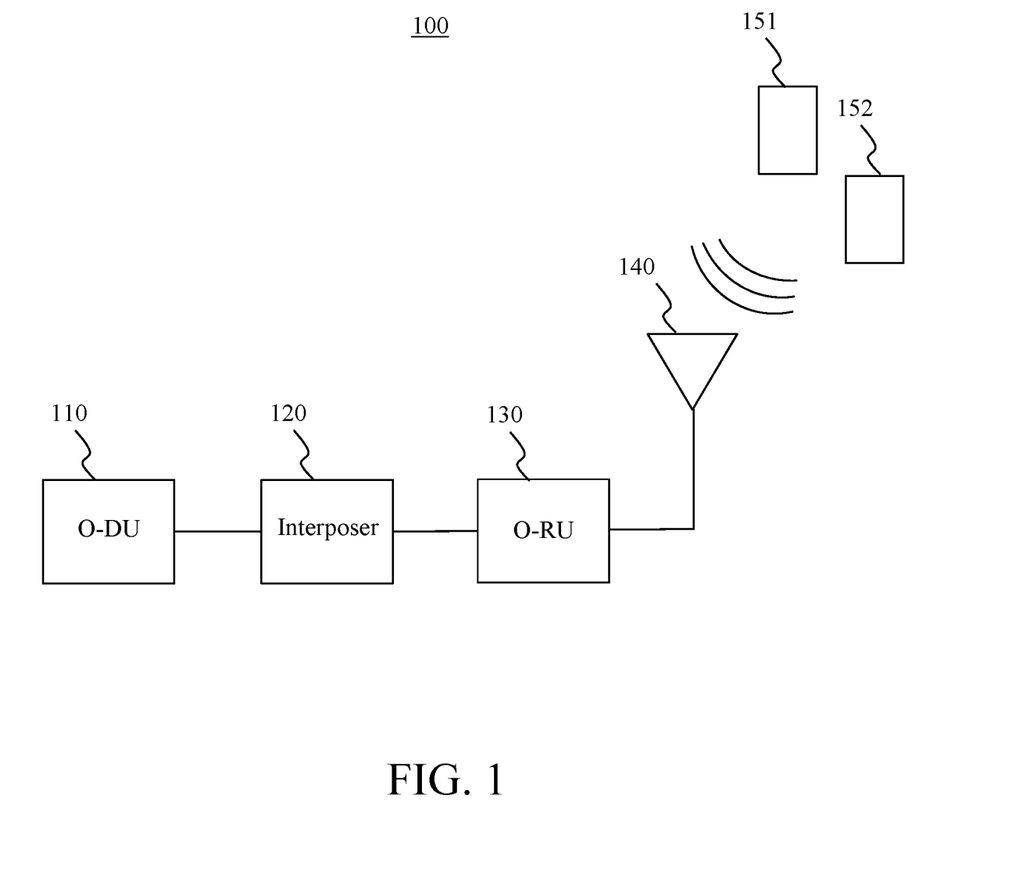
FIG. 1 is a simplified block diagram showing a system for managing a cellular network, according to a representative embodiment.

FIG. 1 is a simplified block diagram of a system for managing a cellular network, according to a representative embodiment.

Referring to FIG. 1, network control system 100 includes an O-RAN distributed unit (0-DU) (first network device) 110, an interposer unit 120, and an O-RAN radio unit (O-RU) (second network device) 130. The network control system 100 further includes an antenna 140 connected to the O-RU 130, which transmits and receives radio frequency (RF) signals to and from user devices, represented by first user device 151 and second user device 152, via over-the-air (OTA) transmissions. The first and second user devices 151 and 152 may be cellular telephones, personal digital assistants, or other mobile communication devices, for example. The O-RU 130 is located at a base station of the cellular network providing a corresponding cell site. The O-DU 110 is connected to the O-RU 130 via fiber optic cables or coaxial cables, for example, and may be located at the base station with the O-RU 130 or located remotely from the base station. The O-DU 110 is connected to a communication network, such as a wide area network (WAN) or the internet, for example, through one or more servers. It is understood that the O-DU 110 and the O-RU 130 are intended to be representative, in that each base station may include additional O-DUs and/or O-RUs, as well as other network elements, without departing from the scope of the present teachings.

The O-DU 110 and the O-RU 130 include servers or other processing units, described below with reference to FIG. 2, for example, capable of communicating using control-plane (C-plane) and user-plane (U-plane) messages for controlling communications with the first and second user devices 151 and 152, e.g., in accordance with O-RAN standards. However, the disclosure is applicable to any first and second network devices that generally meet the provisions set forth by O-RAN standards with regard to uplink frequency assignments, and associated control and user messages, without departing from the scope of the present teachings.

The O-RU 130 further includes a transceiver configured to transmit downlink transmissions to the first and second user devices 151 and 152 and to receive uplink transmissions from the first and second user devices 151 and 152 via the antenna 140, enabling wireless communications over the cellular network. The transceiver includes an analog to digital converter (ADC) for digitizing received signals, including the uplink transmissions from the first and second user devices 151 and 152, and as well as additional signals present in the cell site and received by the O-RU 130. The additional signals are at times and frequencies other than those set aside for the uplink transmissions, and may include transmissions from other user devices and/or interference sources, for example.

Generally, according to various telecommunications standards (e.g., 3G, 4G and 5G standards), when the first user device 151, for example, is ready to send an uplink transmission, it initially transmits a short, unscheduled message to the O-RU 130 via a Physical Random Access Channel (PRACH) essentially informing the network control system 100 that it has n bytes ready to transmit. The unscheduled message is forwarded to the O-DU 110, which runs a scheduler that allocates an assigned portion of a carrier signal in time and frequency to be used by the first user device 151 for the upcoming uplink transmission, discussed below. The scheduled allocation is communicated to the first user device 151 through the O-RU 130.

When the time comes for the uplink transmission, the O-DU 110 generates a first C-plane message requesting a first set of radio resources to be used by the first user device 151 for the uplink transmission. The first set of radio resources identifies the assigned portion of the carrier signal (uplink spectrum) in time and frequency that has been previously allocated for the uplink transmission from the first user device 151. For example, the first set of radio resources may identify a discrete frequency or frequency bandwidth within the total bandwidth of the carrier signal assigned to the uplink transmission. Radio resources are technical parameters of the carrier signal, such as the carrier frequency and bandwidth of the carrier signal. The first C-plane message may be formatted in accordance with the O-RAN standards.

However, instead of providing the first C-plane message directly to the O-RU 130, as in conventional O-RAN control systems, the O-DU 110 outputs the first C-plane message to the interposer unit 120. The interposer unit 120 is also a server or other processing unit capable of communicating using C-plane and U-plane messages. For example, the interposer unit 120 may be O-RAN aware, and is effectively invisible to the O-DU 110 and the O-RU 130. The interposer unit 120 is configured to monitor signals received at the O-RU 130 in order to identify anomalies such as active interference sources within the cellular network, as discussed below.

In the depicted example, the interposer unit 120 receives the first C-plane message from the O-DU 110, and generates a second C-plane message requesting a second set of radio resources. The second set of radio resources identifies a remaining portion of the carrier signal (remaining spectrum) that has not been allocated for the uplink transmission by the O-DU 110. That is, the remaining portion of the carrier signal may be the full spectrum less the assigned portion of the carrier signal allocated for the uplink transmission. For example, the assigned portion of the carrier signal may be a first frequency range within the bandwidth of the carrier signal. Then, the remaining portion of the carrier signal may be a second frequency range from the beginning of the carrier signal bandwidth to the beginning of the first frequency range, and a third frequency range from the end of the first frequency range to the end of the carrier signal bandwidth. The second C-plane message may be formatted in accordance with O-RAN standards. The interposer unit 120 outputs both the first C-plane message and the second C-plane message to the O-RU 130.

The O-RU 130 receives the first and second C-plane messages from the interposer unit 120, identifying the first and second sets of radio resources. In response, the O-RU 130 receives the uplink transmission from the first user device 151 at the scheduled time and frequency in accordance with the first set of radio resources, and receives additional signals present in the cell site in accordance with the second set of radio resources. The O-RU 130 digitizes the uplink transmission to provide first digitized data correlated with the first C-plane message, and also digitizes the additional signals to provide second digitized data correlated with the second C-plane message. The O-RU 130 generates a first U-plane message that includes the first digitized data correlated with the first C-plane message, and a second U-plane message that includes second digitized data correlated with the second C-plane message. In an alternative embodiment, the O-RU 130 generates a single, composite U-plane message that includes both the first and second digitized data, as opposed to separate first and second U-plane messages.

The interposer unit 120 receives the first and second U-plane messages, or the composite U-plane message, from the O-RU 130, and extracts the first and second digitized data to use for monitoring the cellular network. The interposer unit 120 also sends the first digitized data to the O-DU 110, but does not send the second digitized data to the O-DU 110. When the first and second digitized data are provided in separate first and second U-plane messages, as discussed above, the interposer unit 120 sends only the first digitized data to the O-DU 110 by simply forwarding the first U-plane message (and not forwarding the second U-plane message) to the O-DU 110. When the first and second digitized data are included in a composite U-plane message, the interposer unit 120 sends only the first digitized data to the O-DU 110 by filtering out the first digitized data from the composite U-plane message, and forwarding the first digitized data (and not forwarding the second digitized data) to the O-DU 110. In this case, the interposer unit 120 may packetize the first digitized data that is filtered out of the composite U-plane message, where the packets are formatted in accordance with O-RAN standards.

Meanwhile, the interposer unit 120 monitors the full spectrum of the carrier signal to detect anomalies in the cellular network based on the observing of the first and second digitized data. That is, since the interposer unit 120 receives both the first and second digitized data, as opposed to just the first digitized data associated with just the uplink spectrum, it is able to detect the anomalies in the remaining portion of the carrier signal, as well as in the assigned portion of the carrier signal. For example, the interposer unit 120 is able to detect interference sources that are active in the cellular network by identifying signals at times and/or frequencies that are not scheduled for uplink communications.

The interposer unit 120 also may identify misconfigurations of cell sites, and/or find cross-talk between the cell site and other cell sites in the cellular network by comparing the messaging being sent over-the-air among several call sites. Patterns of undesirable intra-cell behavior (e.g., users appearing to move rapidly back and forth between adjacent cell sites) may be detected and communicated to the user. In addition, the interposer unit 120 enables measurement of synchronization between cell sites within the cellular network based on both the first digitized data and the second digitized data, as opposed to just the first digitized data. The measurement of synchronization of cell sites includes comparing how much power from adjacent cells is detectable in the current cell. It is also possible to correlate interference in one cell with the transmissions from another cell, which may indicate inter-cell interference. The interposer unit 120 also enables location determination of the first user device 151 within the cellular network based on both the first digitized data and the second digitized data. Determining the location of the first user device 151 includes monitoring the time and frequency resources used by the legitimate uplink transmission in cells other than the cell it is assigned to. By comparing the received signal strength, phase and delays, the location of the first user device 151 may be better estimated.

Figure 2:
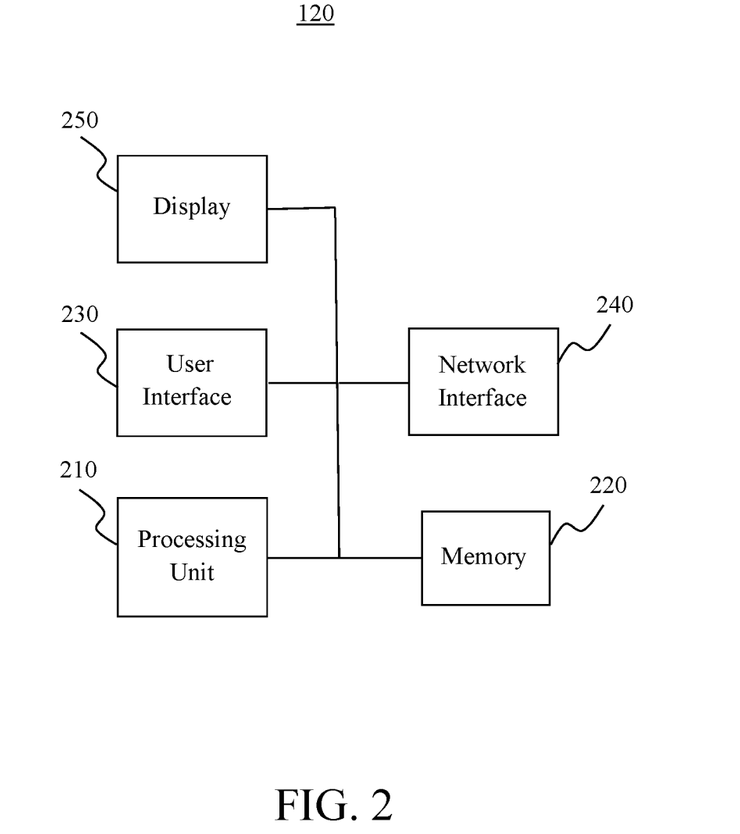
FIG. 2 is a simplified block diagram showing an illustrative implementation of an interposer unit of the system shown in FIG. 1, according to a representative embodiment.

FIG. 2 is a simplified block diagram showing an illustrative implementation of the interposer unit 120, according to a representative embodiment. Notably, the block diagram of FIG. 2 may also apply to implementations of the O-DU 110 and the O-RU 130, as well.

Referring to FIG. 2, interposer unit 120 includes a processing unit 210 and memory 220 for storing instructions executable by the processing unit 210 to implement the processes described herein. The interposer unit 120 further includes a user interface 230 for interfacing with the network operator, and a network interface 240 for interfacing with other network components, including the O-DU 110 and the O-RU 130, and a display 250.

The processing unit 210 is representative of one or more processing devices, and is configured to execute software instructions to perform functions as described in the various embodiments herein. The processing unit 210 may be implemented by a server, a general purpose computer, a central processing unit, one or more processors, microprocessors or microcontrollers, a state machine, a programmable logic device, field programmable gate arrays (FPGAs), application specific integrated circuits (ASICs), or combinations thereof, using any combination of hardware, software, firmware, hard-wired logic circuits, or combinations thereof. As such, the term "processing unit" encompasses an electronic component able to execute a program or machine executable instructions, may be interpreted to include more than one processor or processing core, as in a multi-core processor and/or parallel processors. The processing unit 210 may also incorporate a collection of processors within a single computer system or distributed among multiple computer systems, such as in a cloud-based or other multi-site application. Programs have software instructions performed by one or multiple processors that may be within the same computing device or which may be distributed across multiple computing devices.

The memory 220 may include a main memory and/or a static memory, where such memories may communicate with each other and the processing unit 210 via one or more buses. The memory 220 stores instructions used to implement some or all aspects of methods and processes described herein, including the methods described above with reference to FIGS. 1 and 5, for example. The memory 220 may be implemented by any number, type and combination of random access memory (RAM) and read-only memory (ROM), for example, and may store various types of information, such as software algorithms, data based models including ANN and other neural network based models, and computer programs, all of which are executable by the processing unit 210. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, blu-ray disk, a universal serial bus (USB) drive, or any other form of computer readable storage medium known in the art.

The memory 220 is tangible, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 220 may store software instructions and/or computer readable code that enable performance of various functions. The memory 220 may be secure and/or encrypted, or unsecure and/or unencrypted.

The user interface 230 provides information and data output by the processing unit 210 to the user and/or receives information and data input by the user. That is, the user interface 230 enables the user to enter data and to control or manipulate aspects of the processes described herein, and also enables the processing unit 210 to indicate the effects of the user's control or manipulation. The user interface 230 may include a mouse, a keyboard, a trackball, a joystick, a haptic device, a touchpad, a touchscreen, and/or voice or gesture recognition captured by a microphone or video camera, for example, or any other peripheral or control to permit user feedback from and interaction with the processing unit 210. The network interface 240 provides information and data output by the processing unit 210 to other network components, such as the O-DU 110 and the O-RU 130, and/or receives information and data output by the other network components. The network interface 240 may include one or more of ports, drives, or other types of receiver circuitry.

The display 250 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 250 may also provide a graphical user interface (GUI) for displaying and receiving information to and from the user operating in conjunction with the user interface 230.

Figure 3:
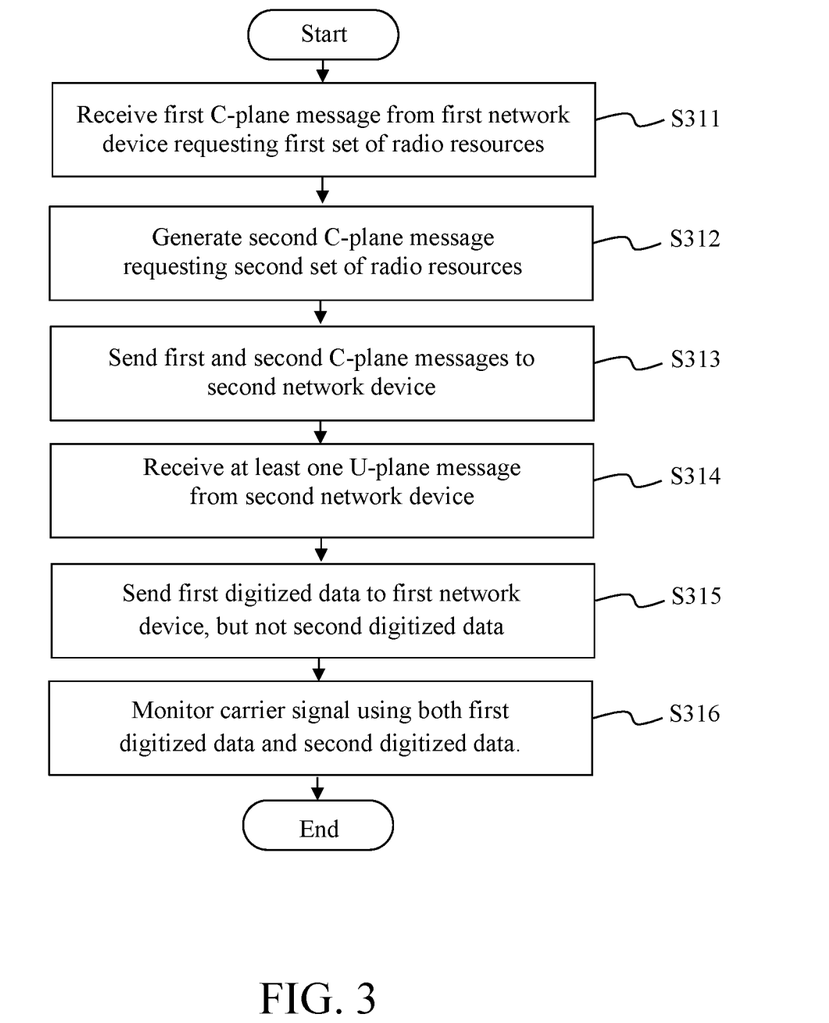
FIG. 3 is a flow diagram showing a method of managing a cellular network, according to a representative embodiment.

FIG. 3 is a flow diagram showing a method of managing a cellular network implemented based on O-RAN standards, according to a representative embodiment. The method may be implemented by the processing unit 210 of the interposer unit 120, for example, where the method steps are provided by instructions stored in the memory 220 and executable by the processing unit 210.

Referring to FIG. 3, a first C-plane message is received from a first network device (e.g., O-DU 110) in block 5311. The first C-plane message requests a first set of radio resources in response to a scheduled uplink transmission from a user device (e.g., first user device 151). In an embodiment, the first network device is initially notified of the pending uplink transmission by the user device through unscheduled messaging per known telecommunications standards, as discussed above. The pending uplink transmission is scheduled in a scheduler, which may be included in the first network element. The first set of radio resources includes an assigned portion of a carrier signal allocated for the uplink transmission (e.g., by the first network device) to be used by the user device. The assigned portion of the carrier signal includes at least one time and at least one frequency in an uplink spectrum of the carrier signal in use by the user device.

In block 5312, a second C-plane message is generated that requests a second set of radio resources. The second set of radio resources includes a remaining portion of the carrier signal not allocated for the uplink transmission. The remaining portion of the carrier signal includes times and frequencies of the carrier signal that are outside of the uplink spectrum, where the remaining portion of the carrier signal is not in use by the user device for the uplink transmission.

In block 5313, the first C-plane message and the second C-plane message are sent to a second network device (e.g., O-RU 130), which is configured to receive the uplink transmission from the user device. The first network device may be an O-DU and the second network device may be an O-RU, or other network devices configured consistently with O-RAN standards, described above. The second network device communicates OTA with the user device via an antenna (e.g., antenna 140).

In block 5314, at least one U-plane message is received from the second network device when the second network device receives the uplink transmission. The at least one U-plane message includes first digitized data from the uplink transmission correlated with the first control-plane message and second digitized data from additional signals in the cell site correlated with the second control-plane message. For example, the at least one U-plane message may include first and second U-plane messages, where the first U-plane message includes the first digitized data from the uplink transmission correlated with the first C-plane message, and the second U-plane message includes the second digitized data from the additional signals correlated with the second C-plane message. Alternatively, the at least one U-plane message may be a composite U-plane message that includes the first digitized data from the uplink transmission correlated with the first C-plane message and the second digitized data from the uplink transmission correlated with the second C-plane message.

In block 5315, only the first digitized data is sent to the first network device, meaning that the first digitized data is sent to the first network device while the second digitized data is not. When the at least one U-plane message includes both first and second U-plane messages, as discussed above, the first digitized data is sent to the first network device simply forwarding the first U-plane message, but not the second U-plane message. When the at least one U-plane message is a composite U-plane message with both the first and second digitized data, the first digitized data is filtered out from the composite U-plane message and forwarded to the first network device.

In block 5316, the full spectrum of the carrier signal is monitored using both the first digitized data and the second digitized data to detect anomalies in the cellular network. The monitoring enables detection of interference sources that are active in the cellular network, identify misconfigurations of cell sites, and/or find cross-talk between the cell site and other cell sites in the cellular network. The monitoring also enables measurement of synchronization between cell sites, and location determination of the user devices within the cellular network based on both the first digitized data and the second digitized data.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit" or "system." Furthermore, aspects of the present invention may take the form of a computer program product embodied in one or more computer readable medium(s) having computer executable code embodied thereon.

While representative embodiments are disclosed herein, one having ordinary skill in the art appreciates that many variations that are in accordance with the present teachings are possible and remain within the scope of the appended claim set. The invention therefore is not to be restricted except within the scope of the appended claims.

The invention claimed is:

1. A system for managing a cellular network implemented based on Open Radio Access Network (O-RAN) standards, the system comprising:
an O-RAN distributed unit (O-DU) configured to generate a first control-plane message requesting a first set of radio resources responsive to a scheduled uplink transmission from a user device, wherein the first set of radio resources comprises an assigned portion of a carrier signal allocated for the uplink transmission;
an interposer unit configured to receive the first control-plane message from the O-DU, and to generate a second control-plane message requesting a second set of radio resources, wherein the second set of radio resources comprises a remaining portion of the carrier signal not allocated for the uplink transmission; and
an O-RAN radio unit (O-RU) configured to receive the first control-plane message and the second control-plane message from the interposer unit, to receive the uplink transmission from the user device, and to generate at least one user-plane message comprising first digitized data from the uplink transmission correlated with the first control-plane message and second digitized data from the uplink transmission correlated with the second control-plane message,
wherein the interposer unit is further configured to receive the at least one user-plane message from the O-RU, to send the first digitized data to the O-DU without sending the second digitized data to the O-DU, and to monitor the carrier signal using both the first digitized data and the second digitized data.

2. The system of claim 1, wherein the at least one user-plane message received by the interposer unit comprises a first user-plane message including the first digitized data from the uplink transmission, and a second user-plane message including the second digitized data from the uplink transmission, and wherein the interposer unit sends the first digitized data to the O-DU by forwarding the first user-plane message to the O-DU.

3. The system of claim 1, wherein the at least one user-plane message received by the interposer unit comprises a composite user-plane message including the first digitized data and second digitized data from the uplink transmission, and wherein the interposer unit sends the first digitized data to the O-DU by filtering out the first digitized data from the composite user-plane message, and sending the filtered first digitized data to the O-DU.

4. The system of claim 1, wherein the interposer unit is further configured to detect interference sources that are active in the remaining portion of the carrier signal, as well as in the assigned portion of the carrier signal, based on the monitoring of the carrier signal.

5. The system of claim 1, wherein the interposer unit is further configured to enable measurement of synchronization between cell sites within the cellular network based on both the first digitized data and the second digitized data.

6. The system of claim 1, wherein the interposer unit is further configured to enable location determination of the user device within the cellular network based on both the first digitized data and the second digitized data.

7. The system of claim 1, wherein the interposer unit is further configured to enable identification of misconfigurations of cell sites and/or identification of cross-talk between cell sites in the cellular network.

8. The system of claim 1, wherein the O-DU comprises a scheduler for initially allocating the assigned portion of the carrier signal for the uplink transmission, including a time of the uplink transmission.

9. A method of managing a cellular network implemented consistent with Open Radio Access Network (O-RAN) standards, the method comprising:
receiving from a first network device a first control-plane message requesting a first set of radio resources responsive to a scheduled uplink transmission from a user device, wherein the first set of radio resources comprises an assigned portion of a carrier signal allocated for the uplink transmission;
generating a second control-plane message requesting a second set of radio resources, wherein the second set of radio resources comprises a remaining portion of the carrier signal not allocated for the uplink transmission;
sending the first control-plane message and the second control-plane message to a second network device configured to receive the uplink transmission from the user device;
receiving from the second network device at least one user-plane message comprising first digitized data from the uplink transmission correlated with the first control-plane message and second digitized data from the uplink transmission correlated with the second control-plane message;

sending the first digitized data to the first network device, and not sending the second digitized data to the first network device; and
monitoring the carrier signal for interference sources using both the first digitized data and the second digitized data.

10. The method of claim 9, wherein the assigned portion of the carrier signal allocated for the uplink transmission comprises at least one time and at least one frequency of the carrier signal in an uplink spectrum in use by the user device, and wherein the remaining portion of the carrier signal allocated for the uplink transmission comprises times and frequencies in the carrier signal outside of the uplink spectrum, not in use by the user device.

11. The method of claim 9, wherein the first network device comprises an O-RAN distributed unit, and the second network device comprises an O-RAN radio unit.

12. The method of claim 9, wherein receiving the at least one user-plane message from the second network device comprises receiving a first user-plane message comprising the first digitized data from the uplink transmission, and receiving a second user-plane message comprising the second digitized data from the uplink transmission, and wherein sending the first digitized data to the first network device comprises forwarding the first user-plane message to the first network device.

13. The method of claim 9, wherein receiving the at least one user-plane message from the second network device comprises receiving a composite user-plane message comprising the first digitized data and second digitized data from the uplink transmission, and wherein sending the first digitized data to the first network device comprises filtering out the first digitized data from the composite user-plane message, and sending the filtered first digitized data to the first network device.

14. The method of claim 9, wherein the first network device comprises a scheduler for initially allocating the assigned portion of the carrier signal for the uplink transmission, including a time of the uplink transmission.

15. The method of claim 9, further comprising enabling location determination of the user device within the cellular network based on both the first digitized data and the second digitized data.

16. A non-transitory computer readable medium storing instructions for managing a cellular network implemented consistent with Open Radio Access Network (O-RAN) standards that, when executed by a processing unit, cause the processing unit to control a process comprising:
receiving from an O-RAN distribution unit (O-DU) a first control-plane message requesting a first set of radio resources responsive to a scheduled uplink transmission from a user device, wherein the first set of radio resources comprises an assigned portion of a carrier signal allocated for the uplink transmission;
generating a second control-plane message requesting a second set of radio resources, wherein the second set of radio resources comprises a remaining portion of the carrier signal not allocated for the uplink transmission;
sending the first control-plane message and the second control-plane message to an O-RAN radio unit (O-RU) configured to receive the uplink transmission from the user device;
receiving from the O-RU at least one user-plane message comprising first digitized data from the uplink transmission correlated with the first control-plane message and second digitized data from the uplink transmission correlated with the second control-plane message;

sending the first digitized data to the O-DU, and not send the second digitized data to the O-DU; and monitoring the carrier signal for interference sources using both the first digitized data and the second digitized data.

17. The non-transitory computer readable medium of claim 16, wherein the assigned portion of the carrier signal allocated for the uplink transmission comprises at least one time and at least one frequency of the carrier signal in an uplink spectrum in use by the user device, and wherein the remaining portion of the carrier signal allocated for the uplink transmission comprises times and frequencies in the carrier signal outside of the uplink spectrum, not in use by the user device.

18. The non-transitory computer readable medium of claim 16, wherein receiving the at least one user-plane message from the O-RU comprises receiving a first user-plane message comprising the first digitized data from the uplink transmission, and receiving a second user-plane message comprising the second digitized data from the uplink transmission, and wherein sending the first digitized data to the O-DU comprises forwarding the first user-plane message to the O-DU.

19. The non-transitory computer readable medium of claim 16, wherein receiving the at least one user-plane message from the O-RU comprises receiving a composite user-plane message comprising the first digitized data and second digitized data from the uplink transmission, and wherein sending the first digitized data to the O-DU comprises filtering out the first digitized data from the composite user-plane message, and sending the filtered first digitized data to the O-DU.

20. The non-transitory computer readable medium of claim 16, wherein the O-DU comprises a scheduler for initially allocating the assigned portion of the carrier signal for the uplink transmission, including a time of the uplink transmission.

* * * * *